United States Patent
Nobayashi

(10) Patent No.: US 11,470,208 B2
(45) Date of Patent: Oct. 11, 2022

(54) IMAGE IDENTIFICATION DEVICE, IMAGE EDITING DEVICE, IMAGE GENERATION DEVICE, IMAGE IDENTIFICATION METHOD, AND RECORDING MEDIUM

(71) Applicant: CANON KABUSHIKI KAISHA, Tokyo (JP)

(72) Inventor: Kazuya Nobayashi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 32 days.

(21) Appl. No.: 17/183,952

(22) Filed: Feb. 24, 2021

(65) Prior Publication Data

US 2021/0266414 A1 Aug. 26, 2021

(30) Foreign Application Priority Data

Feb. 26, 2020 (JP) ................. JP2020-030699

(51) Int. Cl.
*G06F 15/00* (2006.01)
*G06K 1/00* (2006.01)
*H04N 1/00* (2006.01)
*H04N 1/393* (2006.01)

(52) U.S. Cl.
CPC ..... *H04N 1/00167* (2013.01); *H04N 1/00183* (2013.01); *H04N 1/00188* (2013.01); *H04N 1/3935* (2013.01)

(58) Field of Classification Search
CPC .......... H04N 1/00167; H04N 1/00183; H04N 1/00188; H04N 1/3935
See application file for complete search history.

(56) References Cited

U.S. PATENT DOCUMENTS

| | | | |
|---|---|---|---|
| 10,659,744 B2 | 5/2020 | Nobayashi | |
| 2008/0240550 A1* | 10/2008 | Morita | G06T 7/70 382/154 |
| 2011/0249117 A1 | 10/2011 | Yoshihama et al. | |
| 2018/0367772 A1* | 12/2018 | Nobayashi | H04N 13/204 |
| 2019/0220685 A1* | 7/2019 | Uchiyama | G06V 40/10 |
| 2020/0005699 A1* | 1/2020 | Yi | G09G 3/2018 |
| 2020/0336653 A1* | 10/2020 | Kim | H04N 5/2351 |
| 2021/0266414 A1* | 8/2021 | Nobayashi | H04N 1/00183 |

FOREIGN PATENT DOCUMENTS

JP 2011-232330 A 11/2011
JP 2019-009511 A 1/2019

* cited by examiner

*Primary Examiner* — Moustapha Diaby
(74) *Attorney, Agent, or Firm* — Cowan, Liebowitz & Latman, P.C.

(57) ABSTRACT

An electronic album editing device acquires image information and metadata from a storage unit and generates image data. An image identification device includes an image acquisition unit and an image identification unit. The image acquisition unit acquires image information and metadata corresponding to the image information. The image identification unit identifies a type of the acquired image information. The image identification unit identifies a target image as image information for which an actual size ratio can be specified if the metadata includes first information for ascertaining a size when a pixel size of the image information is projected to an object side. An actual size ratio calculation unit calculates an image size corresponding to the actual size ratio using the metadata when the image identification unit has identified an image for which the actual size ratio can be specified.

20 Claims, 5 Drawing Sheets

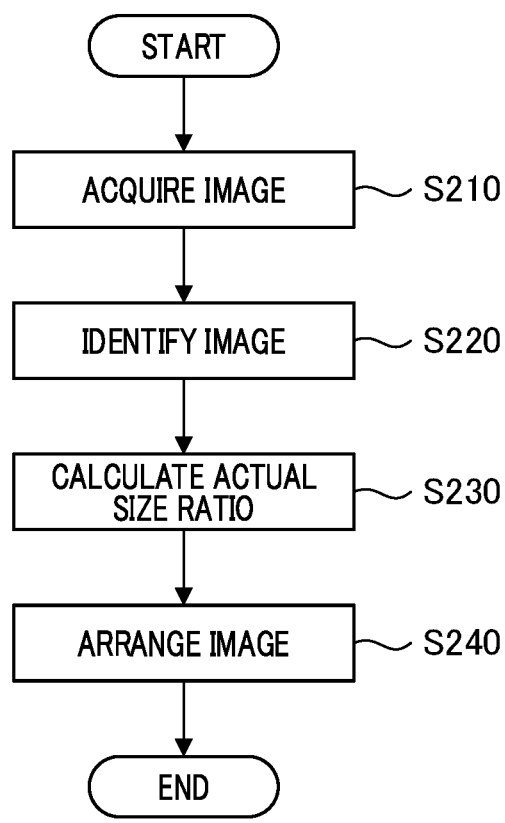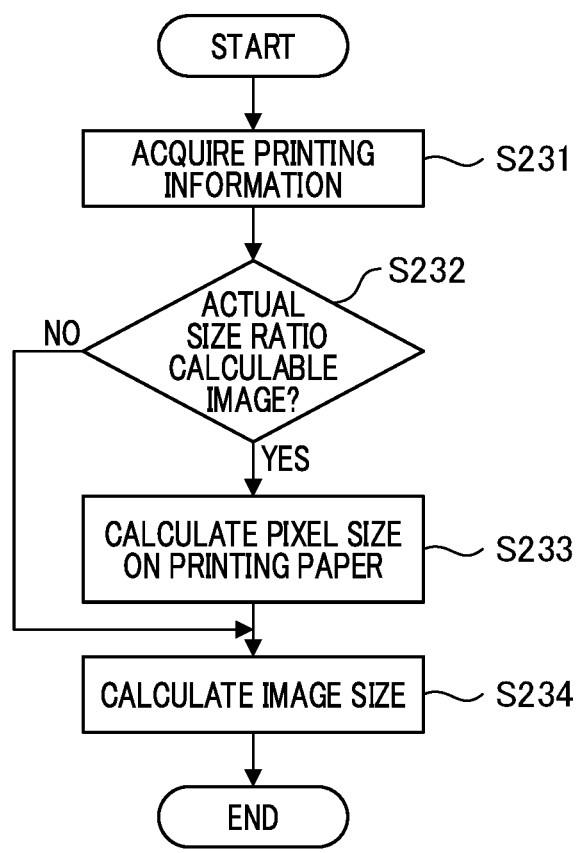

IMAGE IDENTIFICATION DEVICE, IMAGE EDITING DEVICE, IMAGE GENERATION DEVICE, IMAGE IDENTIFICATION METHOD, AND RECORDING MEDIUM

BACKGROUND OF THE INVENTION

Field of the Invention

The present invention relates to a technology of identifying an image which can perform printing or display according to an actual size of a subject in an image editing device and an image generation device.

Description of the Related Art

In a method of calculating distance information from an acquired captured image, for example, distance information can be obtained by acquiring captured images at different viewpoints and obtaining a parallax amount from a correlation value or similarity between the captured images. Japanese Patent Laid-Open No. 2011-232330 discloses an imaging device capable of imaging an object using a stereo imaging device and measuring a length between two designated points. In addition, Japanese Patent Laid-Open No. 2019-9511 discloses an imaging device capable of simultaneously acquiring a captured image and subject distance information by obtaining an image according to light fluxes that have passed through different pupil regions in an imaging optical system included in the imaging device.

It is possible to perform display or printing according to an actual size of a subject by simultaneously acquiring a captured image of the subject and distance information thereof. For example, processing of imaging a child that is a subject at different ages and arranging images of the subject at different ages at the time of imaging on a printing mount according to a predetermined actual size ratio may be performed. Accordingly, a user can produce printed matters by which a growth process of the child can be actually felt.

However, a captured image does not necessarily have image information for allowing printing or display according to an actual size of a subject. In a case where a user views a captured image or a thumbnail image, he/she has difficulty identifying whether the image is an image that can be printed or displayed according to the actual size thereof. In addition, if a plurality of images are arranged on one page in an electronic album, it is generally difficult for a user to identify whether an image can be printed or displayed according to the actual size thereof only by viewing the image. If the size of an image is changed from a predetermined size as instructed by a user although the image can be printed according to the actual size thereof, printing according to the actual size cannot be performed.

SUMMARY OF THE INVENTION

The present invention provides an image identification device for identifying whether an image can be generated according to an actual size of a subject.

A device of an embodiment of the present invention is an image identification device for identifying a type of image information, including at least one processor and memory holding a program which makes the processor function as: an acquisition unit configured to acquire the image information and information related to the image information; and an identification unit configured to identify the type of the image information using the information related to the image information. The identification unit identifies the image information as information of an image for which an actual size ratio of a subject can be specified if first information for ascertaining a size in a case where a pixel size of the image information is projected to an object side is included in the information related to the image information.

Further features of the present invention will become apparent from the following description of exemplary embodiments with reference to the attached drawings.

BRIEF DESCRIPTION OF THE DRAWINGS

FIGS. 2A and 2B are diagrams representing processing of an electronic album editing device according to the first embodiment.

DESCRIPTION OF THE EMBODIMENTS

An image identification device, an image editing device, and an image generation device according to embodiments of the present invention will be described in detail with reference to the drawings. In each embodiment, the image identification device is a device for identifying a type of image information and is applied to the image editing device and the image generation device. The image editing device is a device used by a user for an operation of editing a captured image, and the image generation device is a device for generating an image for printing or an image for display.

First Embodiment

In the present embodiment, an example of performing processing of prohibiting calculation of an image size according to an actual size ratio and change to an arbitrary image size based on an operation instruction of a user if a selected image is an image for which the actual size ratio can be calculated is represented.

Figure 1:
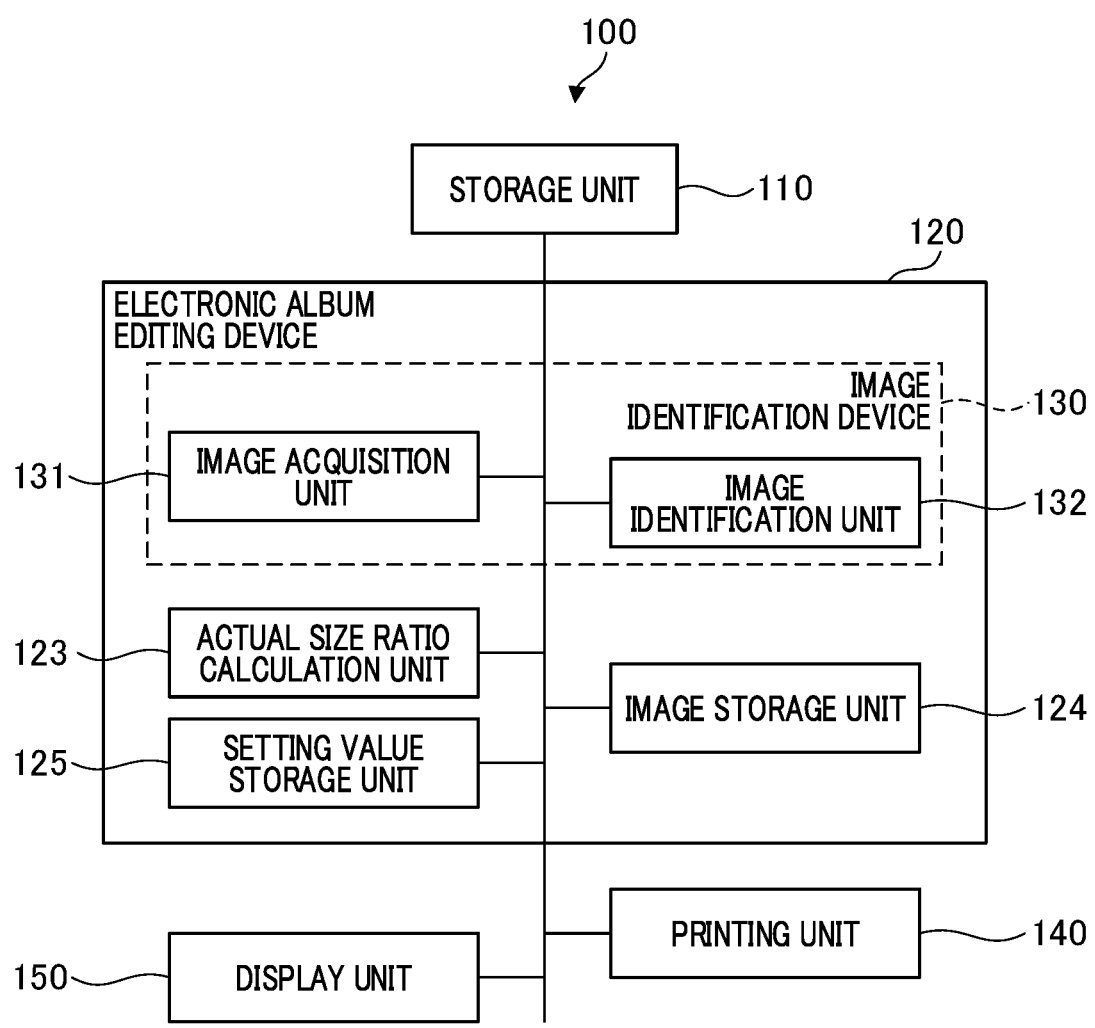
FIG. 1 is a block diagram illustrating a configuration of an electronic album printing device according to a first embodiment.

FIG. 1 is a system configuration diagram schematically illustrating a configuration of an electronic album printing device including an image identification device. The electronic album printing device 100 includes a storage unit 110, an electronic album editing device 120, a printing unit 140, and a display unit 150. Image information used for printing is stored in the storage unit 110. The electronic album editing device 120 acquires the image information from the storage unit 110 and generates image data for printing using the image information.

The printing unit 140 acquires the image data for printing generated by the electronic album editing device 120 and performs processing of printing on predetermined printing paper. The display unit 150 performs processing of displaying an image corresponding to the image data for printing generated by the electronic album editing device 120 and display processing for reporting to a user using the electronic album printing device 100.

The electronic album editing device 120 includes an image identification device 130, an actual size ratio calculation unit 123, an image arrangement unit 124, and a setting value storage unit 125. Various types of setting information used in the electronic album editing device 120 are stored in advance in the setting value storage unit 125.

The image identification device 130 includes an image acquisition unit 131 and the image identification unit 132 for identifying a type of image information. The image identification device 130 identifies whether an image is an image for which an actual size ratio can be calculated (specified) with respect to image information read from the storage unit 110 (hereinafter referred to as a calculable image). For example, the image acquisition unit 131 acquires image information and metadata corresponding to the image information from the storage unit 110. The image identification unit 132 executes processing of identifying whether a target image is an actual size ratio calculable image using the metadata acquired by the image acquisition unit 131. Here, the image information and the metadata corresponding to the image information may be associated and individually stored in the storage unit 110 or may be stored as one file, for example, an image file in the Exif format.

If the target image is identified by the image identification unit 132 as an actual size ratio calculable image, the actual size ratio calculation unit 123 calculates an image size corresponding to the actual size ratio using the metadata acquired by the image acquisition unit 131. With respect to the actual size ratio, an actual size ratio setting value stored in the setting value storage unit 125 can be acquired and used. Alternatively, an input value indicated by a user through a user instruction unit (an operation unit, a touch panel, or the like, which is not shown) may be used as the actual size ratio.

The image storage unit 124 acquires information about a printing paper size from the printing unit 140 and generates image data for printing by performing processing of arranging the image acquired by the image acquisition unit 131 on the printing paper. If the target image is an actual size ratio calculable image identified by the image identification unit 132, the image arrangement unit 124 prohibits change to a size other than the image size using the image size calculated by the actual size ratio calculation unit 123 in principle. In addition, if the image identification unit 132 identifies that the target image is not an actual size ratio calculable image, the image arrangement unit 124 sets an image size using an image size setting value acquired from the setting value storage unit 125 or an input value of a user through the user instruction unit. A position and a segment region at which the image information will be arranged are determined using information acquired by the image arrangement unit 124 from the setting value storage unit 125 or determined using information on a position and a segment region input by the user through the user instruction unit.

The image arrangement unit 124 of the present embodiment prohibits change from an image size calculated by the actual size ratio calculation unit 123 to other image sizes for an actual size ratio calculable image identified by the image identification unit 132. It is possible to print the actual size ratio calculable image according to the actual size ratio by prohibiting changing of an image size for the actual size ratio calculable image. In processing of printing the actual size ratio calculable image, a measure for preventing acquisition of a printing result different from the actual size ratio which is not intended by the user is considered. That is, in a case where the user instructs the electronic album editing device 120 to change the image size for the actual size ratio calculable image, processing of reporting a printing result of a ratio different from the actual size ratio to the user through the display unit 150 is executed. In a case where the user performs instruction for permitting change to an image size at a ratio different from the actual size ratio as a result of the report to the user, the image arrangement unit 124 changes the image size even if the target image is an actual size ratio calculable image.

Next, processing performed by the electronic album editing device 120 will be described with reference to FIGS. 2A and 2B. In a flowchart of FIG. 2A, in response to start of processing of generating image data for printing according to a user instruction, the processing proceeds to processing of S210.

In S210, the image acquisition unit 131 acquires image information and metadata corresponding to the image information from the storage unit 110. For example, the image information and the metadata may be stored as separate data files and held in the storage unit 110. Alternatively, both the image information and the metadata are stored in one data file and held in the storage unit 110 in consideration of an error in association of the metadata with the image information and efforts required to maintain the metadata. For example, the metadata can be stored in a header region of a data file including the image information.

In S220, the image identification unit 132 identifies the type of the image information using the metadata acquired by the image acquisition unit 131 in S210. In S220, if the metadata includes information by which a size when a pixel size of the image information is projected to an object side can be calculated, the image identification unit 132 identifies the acquired image as an actual size ratio calculable image. That is, if the metadata includes the information by which a size (hereinafter, referred to as a projection size) when the pixel size of the image side is projected to the object side can be calculated, an actual size ratio can be calculated. The information by which the projection size can be calculated will be described later using FIG. 3.

In S230, the actual size ratio calculation unit 123 calculates an image size on printing paper according to a predetermined actual size ratio using the metadata acquired by the image acquisition unit 131 in S210 if the target image is an actual size ratio calculable image. Actual size ratio calculation processing will be described in detail later using FIG. 2B. In S240, the image arrangement unit 124 generates image data for printing by determining an image size, a position and a segment region of the image information to be arranged on the printing paper.

Figure 3A:
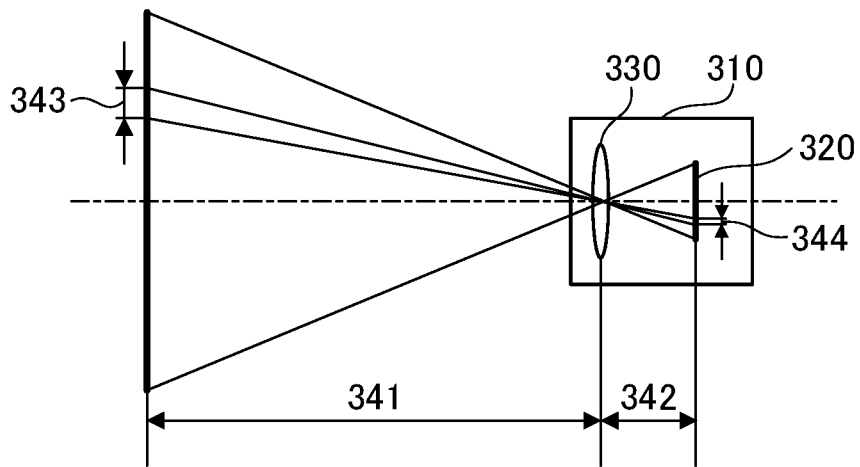
FIGS. 3A and 3B are diagrams representing information for projecting a pixel size to an object side.

A method of calculating a pixel size (projection size) on an object side will be described with reference to FIGS. 3A and 3B. FIG. 3A is a schematic diagram representing information for projecting a pixel size to an object side. An imaging device 310 includes an imaging optical system 330 and an imaging element 320. FIG. 3A illustrates a pixel size 344 on the image side corresponding to a pixel size 343 on the object side. The pixel size 344 on the image side is a pixel pitch of the imaging element 320 in general. The pixel size 343 on the object side is a value obtained by multiplying the pixel size 344 on the image side by an imaging magnification.

The imaging magnification is provided as a ratio of a distance 341 between a principal point of the imaging optical system 330 on the object side and a subject to a distance 342 between a principal point of the imaging optical system 330 on the image side and the imaging element 320. Meanwhile, the distance 341 may be approximated to a distance from the top of a lens of the imaging optical system 330 closest to the object side. In addition, the distance 342 may be approximated to a focal distance of the imaging optical system 330. That is, the pixel size 343 on the object side can be calculated if the pixel size and the imaging magnification of the imaging element 320 are ascertained. The imaging magnification is calculated on the premise that the distance to the subject and the distance between the principal point of the imaging optical system and the imaging element (or the focal distance of the imaging optical system 330) are ascertained. Distance information of the subject can be calculated from a plurality of pieces of image data with different viewpoints, for example, according to an imaging plane phase difference detection method using a pupil division type imaging element.

Although the method of projecting the pixel size of the imaging element 320 to the object side has been described with reference to FIG. 3A, there is a method of projecting to the object side by multiplying the width of an effective region (vertical width and vertical width) of the imaging element 320 by the imaging magnification as another method. It is possible to calculate the pixel size projected to the object side by dividing the size of the effective region of the imaging element 320 projected to the object side by the number of pixels (the number of horizontal pixels×the number of vertical pixels) of the image information.

The distance between the imaging optical system 330 and the subject (subject distance) may be a distance to any one point with respect to subject region information included in the image information. Considering a case in which the subject and the imaging device 310 do not face each other, it is desirable that the distance information of the subject be acquired at a plurality of view angles and stored in metadata. Meanwhile, the distance information is depth information representing a depth of the subject in the depth direction in a captured image. The depth information may include an image distortion amount map calculated from a plurality of viewpoint images having different viewpoints, and a defocus amount map calculated by multiplying an image distortion amount by a predetermined conversion factor, for example. A distance map obtained by converting a defocus amount into distance information of the subject and distance image information represent a distance distribution with respect to the captured image.

Figure 3B:
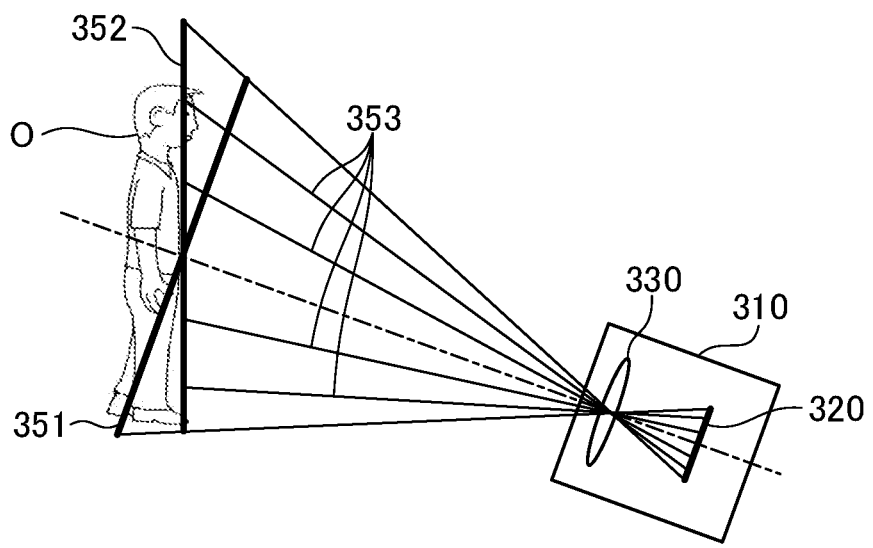

FIG. 3B is an explanatory diagram in a case where a subject O and the imaging device 310 do not face each other. A case in which a pixel size on an object side is calculated using a distance to the subject at only one point at the center of a view angle is conceived. In this case, a plane 351 is inclined with respect to a plane 352 along the subject O. Since the size of the subject O is calculated along this plane 351, an error is likely to occur in the pixel size on the object side on the lower side and the upper side of the subject O. That is, it is desirable that the size of the subject O be measured along the plane 352 involved with the subject O. Accordingly, processing of acquiring distances to the subject O with respect to a plurality of view angles (e.g., view angles along a plurality of straight lines 353) in addition to the center of the view angle and calculating the pixel size on the object side in response to the view angle is performed. There are a method of storing distance information of a subject at a plurality of view angles in a file as metadata and a method of calculating an imaging magnification of a plurality of view angles through the aforementioned calculation method and storing information on the calculated imaging magnification in a file as metadata. That is, as information (first information) for determining an image for which a pixel size of image information obtained when the pixel size is projected to an object side is known, that is, an actual size ratio can be specified, for example, the following information may be conceived. An image for which an actual size ratio can be specified is determined by determining whether at least one piece of this information is included in information related to the image.

Pixel size 343 on object side
Pixel size 344 on image side and imaging magnification
Pixel size 344 on image side, distance information (or depth information) of subject, and focal distance
Width of effective region (horizontal width and vertical width) of imaging element 320, imaging magnification, and number of pixels
Width of effective region (horizontal width and vertical width) of imaging element 320, distance information (or depth information) of subject, focal distance, and number of pixels In addition, as the information (first information) for determining an image for which an actual size ratio can be specified, the number of pixels per unit length may be calculated and recorded as resolution information in the Exif format. Meanwhile, although 1 mm may be used as the unit length, 1 inch may be used and recorded as pixels per inch (PPI) information if printing is considered.

The distance between the imaging optical system 330 and the subject O can be calculated using the following Equation (1) based on an imaging formula of a lens.

$$b=1/\{1/f-1/a\} \quad \text{Equation (1)}$$

In Equation (1), b represents a distance between a principal point of the imaging optical system 330 on the object side and the subject O. f represents a focal distance of the imaging optical system 330 and a represents a distance between a principal point of the imaging optical system 330 on the image side and an image point. The distance between the principal point of the imaging optical system 330 on the image side and the image point can be calculated using the distance 342 and a defocus amount (distance between the imaging element 320 and the image point). Accordingly, the defocus amount may be stored in a file as metadata instead of the distance between the imaging optical system 330 and the subject. The defocus amount can be detected by a focus detection unit (not shown) included in the imaging device 310 through a known method.

Next, the actual size ratio calculation processing illustrated in S230 of FIG. 2A will be described with reference to FIG. 2B. In S231, the actual size ratio calculation unit 123 acquires information of the printing unit 140 during printing (hereinafter, referred to as printing information). For example, resolution information represented as the number of dots per unit length (dpi) may be acquired as the printing information.

S232 is processing of determining whether a target image is an actual size ratio calculable image. In the determination processing, the image identification result in S220 of FIG. 2A can be used. If it is determined that the target image is an actual size ratio calculable image, the processing proceeds to processing of S233. If it is determined that the target image is not an actual size ratio calculable image, the processing proceeds to processing of S234.

In S233, the actual size ratio calculation unit 123 calculates a pixel size on printing paper with respect to the image information acquired in S210 of FIG. 2A. The pixel size on the printing paper can be calculated by multiplying a pixel size projected to the object side by a predetermined actual size ratio. The pixel size projected to the object side can be calculated through the method described using FIGS. 3A and 3B. As the predetermined actual size ratio, for example, a value such as one time or 0.5 times can be set in advance and used. Alternatively, the actual size ratio may be set using a value input by the user through the user instruction unit included in the electronic album printing device 100.

In S234, the actual size ratio calculation unit 123 calculates an image size on the printing paper. The actual size ratio calculation unit 123 multiplies the number of horizontal pixels and the number of vertical pixels of the image information by the pixel size on the printing paper calculated in S233. Further, the actual size ratio calculation unit 123 calculates an image size in the horizontal direction and an image size in the vertical direction on the printing paper using the printing information acquired in S231.

After the processing of S234, the processing proceeds to processing of S240 of FIG. 2A, and the image arrangement unit 124 determines an image size, a position and a segment region of image information to be arranged on the printing paper and generates image data for printing. Specifically, first, processing of acquiring size information of the printing paper from the printing unit 140 is executed. Subsequently, the image arrangement unit 124 sets the image size of the image information. If the target image is an actual size ratio calculable image, the image size calculated in S230 is used. If the target image is not an actual size ratio calculable image, a setting value with respect to an image size is acquired from the setting value storage unit 125 and used or a value input by the user through the user instruction unit is used.

If the target image is an actual size ratio calculable image, the image arrangement unit 124 prohibits change to an arbitrary image size in principle. Subsequently, the image arrangement unit 124 sets a segment region of the image information. With respect to the segment region, region information about the segment region can be acquired from the setting value storage unit 125 and used. Alternatively, a value representing a segment region input by the user through the user instruction unit can be used. When the image arrangement unit 124 sets a position with respect to arrangement of the image information, the image arrangement unit 124 acquires a setting value of the position with respect to arrangement from the setting value storage unit 125 and uses the setting value or uses a setting value input by the user through the user instruction unit. Subsequently, the display unit 150 displays an image corresponding to the image information for printing on a screen. The image arrangement unit 124 outputs image data for display corresponding to the image information for printing to the display unit 150, and the display unit 150 acquires the image data for display and performs display processing. When an operation of instructing the image information for printing is performed through the user instruction unit, the image information for printing is decided.

In the present embodiment, it is possible to identify whether an image can be printed or displayed according to an actual size. It is possible to prevent a user from mistakenly editing an image in an image size at a ratio different from an actual size ratio when image information of the image can be printed or displayed according to the actual size.

An example of the electronic album printing device 100 has been described in order to describe functions of the image identification device according to the present invention. The present invention is not limited thereto, and there is an embodiment in which electronic album data generated by the electronic album editing device 120 is transmitted to a server and the server performs processing of printing the electronic album. This applies to the following modified example and embodiment.

Modified Example of First Embodiment

Next, a modified example of the first embodiment will be described in detail. In the modified example, in a case where a plurality of images have been selected, processing of selecting only actual size ratio calculable images therefrom and arranging the selected images in a time series is performed.

Figure 4A:
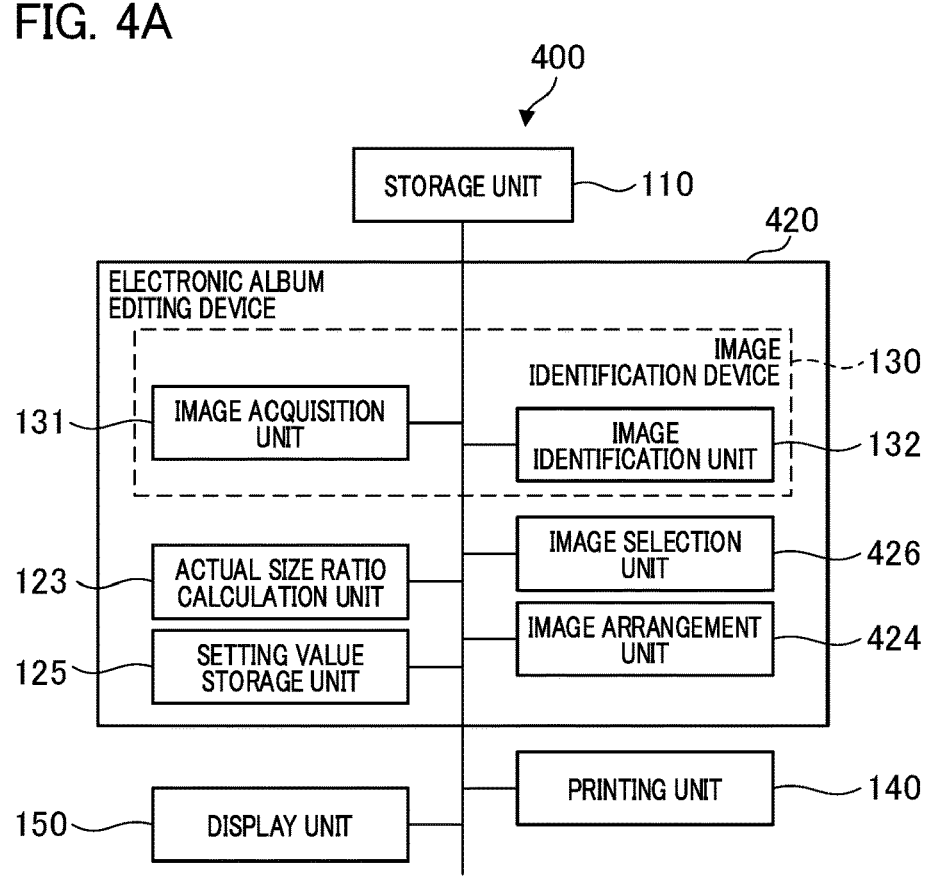
FIGS. 4A and 4B are diagrams representing an electronic album printing device according to a modified example of the first embodiment.

FIG. 4A is a system configuration diagram schematically illustrating an electronic album printing device 400 of the modified example. The electronic album printing device 400 differs from that in FIG. 1 with respect to an image selection unit 426 and an image arrangement unit 424 included in an electronic album editing device 420. Accordingly, differences will be mainly described and detailed description of the same components as in FIG. 1 will be omitted by using signs that have already been used. This method of omitting description applies to an embodiment which will be described later.

The image selection unit 426 performs processing of selecting actual size ratio calculable images identified by the image identification device 130. Images for which the user has instructed a selecting operation through the user instruction unit are selected from actual size ratio calculable images. Hereinafter, an image selected by the image selection unit 426 is referred to as a selected image.

The actual size ratio calculation unit 123 calculates an image size according to an actual size ratio using metadata corresponding to the selected images. The image arrangement unit 424 arranges the selected images using the image size calculated by the actual size ratio calculation unit 123 and generates image data for printing. Processing of acquiring information about a date and time or a time of imaging of each selected image from the metadata corresponding to the selected images and arranging image information in a time series is executed.

Figure 4B:
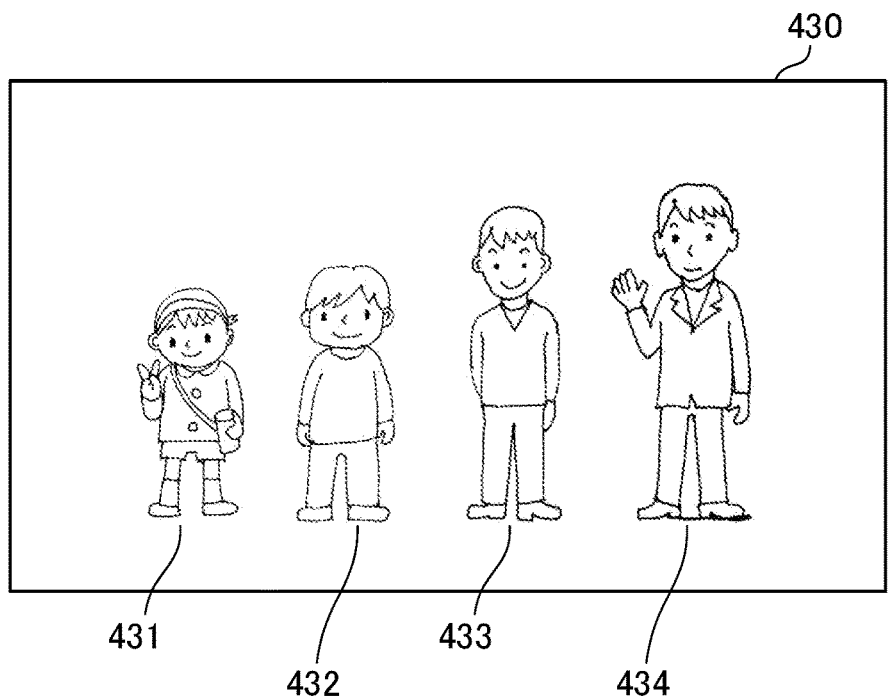

A method of arranging images in a time series will be described with reference to FIG. 4B. FIG. 4B illustrates an example in which four selected images are arranged on printing paper 430. Selected images 431 to 434 represent captured images of the same person. The selected image 431, the selected image 432, the selected image 433, and the selected image 434 are arranged from the left in ascending order of imaging dates. The image arrangement unit 424 performs processing of arranging the selected images 431 to 434 from the left to the right of the printing paper 430 in a time series of imaging time (in the order of imaging dates).

In the electronic album editing device 420, the image identification device 130 and the image selection unit 426 select actual size ratio calculable images from a plurality of images. It is difficult for the user to identify whether a target image is an actual size ratio calculable image. Accordingly, in the modified example, the image identification device 130 and the image selection unit 426 automatically select actual size ratio calculable images from a plurality of images. Accordingly, a burden of image selection on the user can be reduced.

According to the modified example, the image arrangement unit 424 can arrange images of the same person on the printing paper 430 illustrated in FIG. 4B at a predetermined actual size ratio in a time series. Accordingly, the user can actually feel a growth process of the subject by viewing a generated printed matter.

The image selection unit 426 can select a desired image of the user from actual size ratio calculable images. For example, if a growth process of the same person is configured as a plurality of images and represented as illustrated in FIG. 4B, the user can select one person. Further, a configuration in which images that correspond to the same person as the person selected by the user and have been captured at predetermined time intervals are selected may be possible. In this manner, a burden of image selection on the user can be reduced. When the image selection unit 426 selects desired images of the user, actual size ratio calculable images and images for which an actual size ratio cannot be calculated are presented to the user in a distinguishable manner. For example, the display unit 150 may display thumbnail images that are a list of images on the screen such that the user easily recognizes image types. Thumbnail images with respect to actual size ratio calculable images are displayed with emphasis, and thumbnail images with respect to images for which an actual size ratio cannot be calculated are displayed without emphasis or suppressed (e.g., deterioration of brightness, chroma, and the like). An actual size ratio calculable image may be reported through attribute information of the actual size ratio calculable image, an icon on the image, or the like. The display unit 150 displays an image on the basis of an identification result of the image identification device 130 such that the user easily recognizes the image, and thus a burden of image selection on the user can be reduced. That is, in image selection processing, it is more effective to present to the user image information identified as an actual size ratio calculable image and image information for which an actual size ratio cannot be calculated among a plurality of pieces of image information in a distinguishable state.

In addition, the electronic album printing device 400 can automatically determine whether a person corresponding to image information is the same as a person selected by the user by determining whether the image information satisfies a predetermined rule. The predetermined rule may be, for example, a rule for determination using known machine learning. Processing of determining whether a condition that a viewpoint of a captured image is a predetermined viewpoint (a viewpoint at which an optical axis during imaging is approximately parallel to the ground such as in imaging from the front) is satisfied is executed. It is possible to produce a printed matter by which the user can more realistically feel a growth process of the same person by lining viewpoints of captured images up. The printed matter is produced using the printing unit 140 or a printing device included in a server which acquires image data for printing.

Second Embodiment

Next, a second embodiment of the present invention will be described with reference to FIG. 5. In the present embodiment, processing of selecting only an actual size ratio calculable image from a plurality of images and printing the selected image in a case where the plurality of images have been selected is represented.

Figure 5:
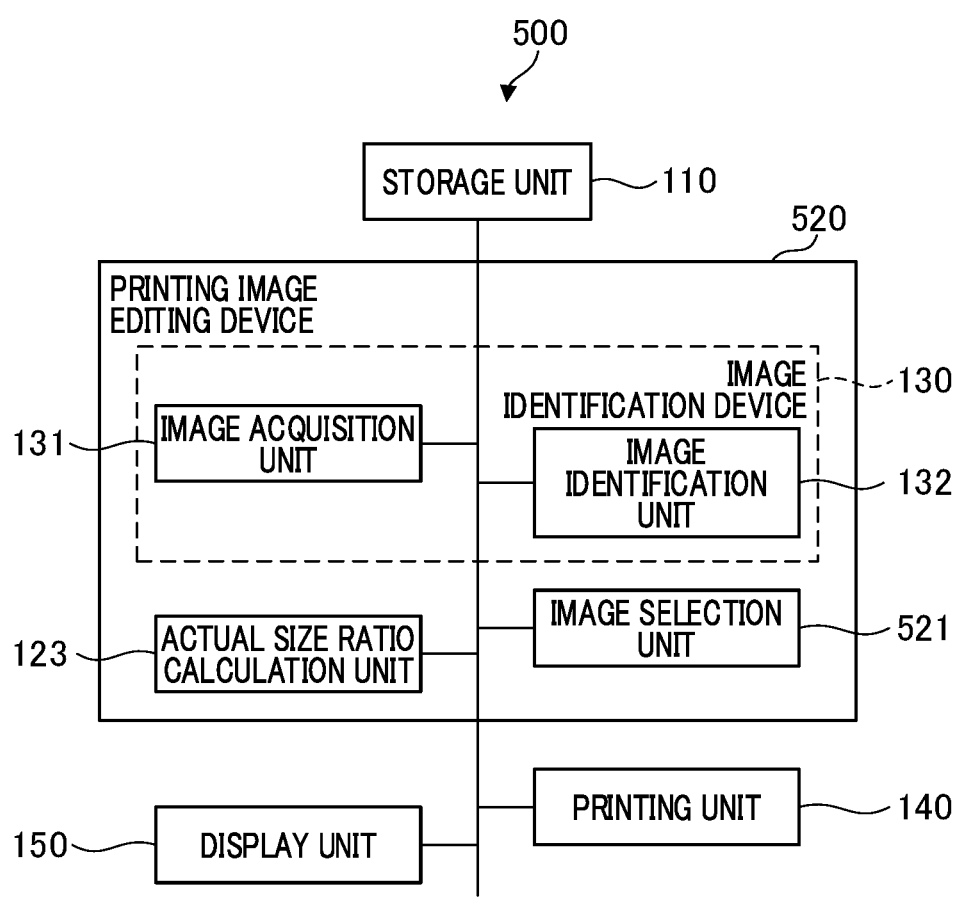
FIG. 5 is a block diagram illustrating a configuration of an image printing device according to a second embodiment.

FIG. 5 is a system configuration diagram schematically illustrating a configuration of an image printing device 500. The image printing device 500 includes the storage unit 110, a printing image editing device 520, the printing unit 140, and the display unit 150. The printing image editing device 520 includes the image identification device 130, an image selection unit 521, and the actual size ratio calculation unit 123.

The image selection unit 521 selects only an image identified as an actual size ratio calculable image by the image identification device 130 from a plurality of images acquired by the image acquisition unit 131. That is, an image selected by the image selection unit 521 is a selected image.

The actual size ratio calculation unit 123 calculates an image size according to an actual size ratio on printing paper through processing of S231, S233 and S234 illustrated in FIG. 2B with respect to only the image selected by the image selection unit 521. The printing image editing device 520 outputs image data for printing corresponding to the selected image to the printing unit 140. The printing unit 140 receives the image data for printing corresponding to the selected image and performs printing on printing paper.

It is difficult to identify an image that can be printed according to an actual size of a subject only by viewing a preview display image or a thumbnail image on the screen of the display unit 150. Accordingly, the printing image editing device 520 automatically selects only an image that can be printed according to the actual size and executes printing processing. As a result, a burden of image selection on the user can be reduced. With respect to the image data for printing generated by the printing image editing device 520, a printed matter is produced according to a printing instruction for the printing unit 140 or a printing instruction for a printing device from a server that acquires the image data for printing.

In the present embodiment, the actual size ratio calculation unit 123 may calculate an image size that becomes a predetermined actual size ratio on the display screen of the display unit 150. In this case, in S231 of FIG. 2B, resolution information of the display unit 150 is acquired instead of the printing information. In S233, processing of calculating a pixel size on the display screen using the resolution information of the display unit 150 is executed. The printing image editing device 520 generates image data for display in the determined pixel size. The image data for display is output to the display unit 150 and display processing is performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the fictions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-030699, filed Feb. 26, 2020, which is hereby incorporated by reference wherein in its entirety.

What is claimed is:

1. An image identification device for identifying a type of image information, comprising:
   at least one processor and memory holding a program which makes the processor function as:
   an acquisition unit configured to acquire the image information and information related to the image information; and
   an identification unit configured to identify the type of the image information using the information related to the image information,
   wherein the identification unit identifies the image information as information of an image for which an actual size ratio of a subject can be specified if first information for ascertaining a size when a pixel size of the image information is projected to an object side is included in the information related to the image information.

2. The image identification device according to claim 1, wherein the identification unit identifies the image information as information of the image for which the actual size ratio can be specified if information of the pixel size or a pixel pitch of the image information and an imaging magnification is included in the information related to the image information as the first information.

3. The image identification device according to claim 1, wherein the identification unit identifies the image information as information of the image for which the actual size ratio can be specified if information of the pixel size or a pixel pitch of the image information projected to the object side is included in the information related to the image information as the first information.

4. The image identification device according to claim 1, wherein the identification unit identifies the image information as information of the image for which the actual size ratio can be specified if information of a view angle of an imaging device used when the image information is acquired, a width of an image with respect to the image information projected to the object side, and the number of pixels of the image information is included in the information related to the image information as the first information.

5. The image identification device according to claim 1, wherein the identification unit identifies the image information as information of the image for which the actual size ratio can be specified if information of the pixel size or a pixel pitch of the image information, a subject distance, and a focal distance is included in the information related to the image information as the first information.

6. The image identification device according to claim 1, wherein the identification unit identifies the image information as information of the image for which the actual size ratio can be specified if a number of pixels per unit length of the object side is included in the information related to the image information as the first information.

7. The image identification device according to claim 1, wherein the identification unit identifies the image information as information of the image for which the actual size ratio can be specified if pixels per inch (PPI) information is included in the information related to the image information as the first information.

8. An image editing device for editing image information, comprising:
   at least one processor and memory holding a program which makes the processor function as:
   an acquisition unit configured to acquire the image information and information related to the image information;
   an identification unit configured to identify a type of the image information using the information related to the image information;
   a calculation unit configured to calculate an image size based on an actual size ratio of a subject with respect to the image information; and
   an image arrangement unit configured to determine a position at which an image corresponding to the image information will be arranged and a segment region of the image and perform image arrangement in the image size,
   wherein the identification unit identifies the image information as information of an image for which the actual size ratio of the subject can be specified if first information for ascertaining a size when a pixel size of the image information is projected to an object side is included in the information related to the image information, and
   the calculation unit calculates the image size when the identification unit has identified image information for which the actual size ratio can be specified.

9. The image editing device according to claim 8, wherein the processor further functions as an instruction unit configured to instruct changing of the image size, and
   wherein the image arrangement unit performs setting for prohibiting change of the image size based on the instruction of the instruction unit when the identification unit has identified the image information as information of an image for which the actual size ratio can be specified.

10. The image editing device according to claim 9, wherein the processor further functions as a reporting unit configured to report display or printing that does not correspond to the actual size ratio when the identification unit has identified image information for which the actual size ratio can be specified and the instruction unit has instructed the changing of the image size.

11. The image editing device according to claim 8, wherein the processor further functions as a selection unit configured to select image information identified by the identification unit as information of an image for which the actual size ratio can be specified from a plurality of pieces of image information acquired by the acquisition unit.

12. The image editing device according to claim 11, wherein the processor further functions as a presentation unit configured to present an image corresponding to image information selected by the selection unit and an image corresponding to image information that is not selected by the selection unit in a distinguishable manner.

13. The image editing device according to claim 11, wherein the selection unit selects the image information if the image information for which the actual size ratio can be specified is image information of the same subject.

14. The image editing device according to claim 13, wherein the selection unit selects the image information if the image information for which the actual size ratio can be specified is information of an image of the subject captured at a predetermined viewpoint.

15. The image editing device according to claim 11, wherein the selection unit selects the image information if the image information for which the actual size ratio can be specified is information of images of the subject captured at different times.

16. An image generation device comprising:
at least one processor and memory holding a program which makes the processor function as:
an acquisition unit configured to acquire image information and information related to the image information;
an identification unit configured to identify a type of the image information using the information related to the image information;
a calculation unit configured to calculate an image size based on an actual size ratio of a subject with respect to the image information;
an image arrangement unit configured to determine a position at which an image corresponding to the image information will be arranged and a segment region of the image and perform image arrangement in the image size; and
an output unit configured to display or print the image arranged by the image arrangement unit,
wherein the identification unit identifies the image information as information of an image for which the actual size ratio of the subject can be specified if first information for ascertaining a size when a pixel size of the image information is projected to an object side is included in the information related to the image information, and
the calculation unit calculates the image size when the identification unit has identified image information for which the actual size ratio can be specified.

17. An image generation device comprising:
at least one processor and memory holding a program which makes the processor function as:
an acquisition unit configured to acquire image information and information related to the image information:
an identification unit configured to identify a type of the image information using the information related to the image information;
a selection unit configured to select image information identified by the identification unit as information of an image for which an actual size ratio can be specified from a plurality of pieces of image information acquired by the acquisition unit;
a calculation unit configured to calculate an image size on printing paper corresponding to the actual size ratio with respect to the image information selected by the selection unit; and
a transmission unit configured to transmit the image information selected by the selection unit and image data for printing based on the image size calculated by the calculation unit to a printing unit,
wherein the identification unit identifies the image information as information of an image for which the actual size ratio of a subject can be specified if first information for ascertaining a size when a pixel size of the image information is projected to an object side is included in the information related to the image information.

18. An image generation device comprising:
at least one processor and memory holding a program which makes the processor function as:
an acquisition unit configured to acquire image information and information related to the image information;
an identification unit configured to identify a type of the image information using the information related to the image information;
a selection unit configured to select image information identified by the identification unit as information of an image for which an actual size ratio can be specified from a plurality of pieces of image information acquired by the acquisition unit;
a calculation unit configured to calculate an image size on a display screen of a display device corresponding to the actual size ratio with respect to the image information selected by the selection unit; and
an output unit configured to output the image information selected by the selection unit and image data for display based on the image size calculated by the calculation unit to the display device,
wherein the identification unit identifies the image information as information of an image for which the actual size ratio of a subject can be specified if first information for ascertaining a size when a pixel size of the image information is projected to an object side is included in the information related to the image information.

19. An image identification method executed in an image identification device for identifying a type of image information, comprising:
acquiring the image information and information related to the image information; and
identifying the type of the image information using the information related to the image information,
wherein, in the identifying, processing of identifying the image information as information of an image for which an actual size ratio of a subject can be specified if first information for ascertaining a size when a pixel size of the image information is projected to an object side is included in the information related to the image information is performed.

20. A non-transitory recording medium storing a control program of an image identification device for identifying a type of image information causing a computer to perform each step of a control method of the image identification device, the method comprising:
acquiring the image information and information related to the image information; and
identifying a type of the image information using the information related to the image information,
wherein, in the identifying, processing of identifying the image information as information of an image for which an actual size ratio of a subject can be specified if first information for ascertaining a size when a pixel size of the image information is projected to an object side is included in the information related to the image information is performed.

* * * * *